Figure 1:
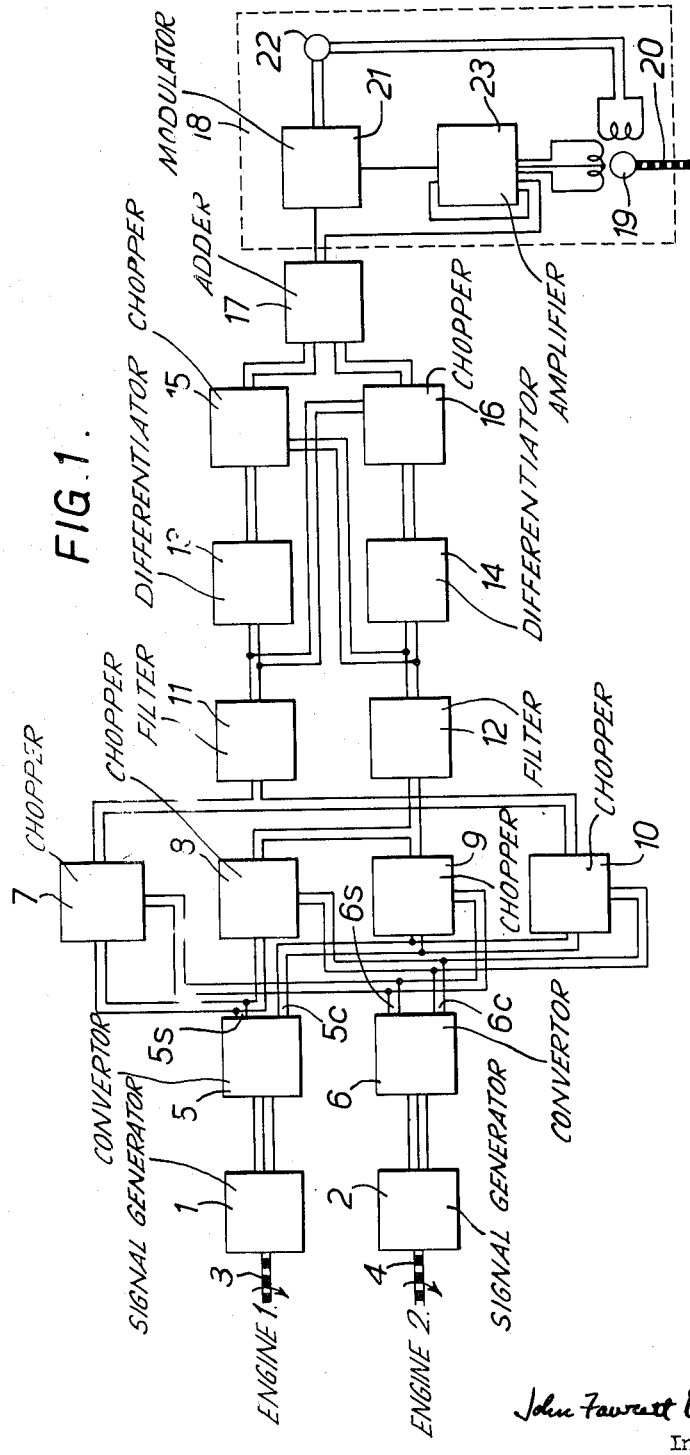

July 5, 1966  J. F. O. EVANS  3,259,800
ELECTRIC SIGNAL GENERATING APPARATUS
Filed March 18, 1963  2 Sheets-Sheet 1

Inventor
John Fawcett Ogilvie Evans

Moore, Hall & Pollock
Attorneys

United States Patent Office 3,259,800
Patented July 5, 1966

3,259,800
ELECTRIC SIGNAL GENERATING APPARATUS
John Fawcett Ogilvie Evans, Woodmancote, near Cheltenham, England, assignor to S. Smith & Sons (England), Limited, London, England, a British company
Filed Mar. 18, 1963, Ser. No. 266,094
6 Claims. (Cl. 317—5)

The present invention relates to electric signal generating apparatus and is concerned in particular with apparatus for generating an electric signal which is dependent in magnitude on the difference in frequency of two periodic signals and also in sense on the sense of the difference. The periodic signals may be electrical signals as such or electrical signals derived from some other periodic phenomenon such as the rotary motion of the rotor shaft of a motor or other power plant.

According to the present invention electric signal generating apparatus comprises means for generating first and second signals in quadrature with one another and having the frequency of a first periodic signal or phenomenon, means for generating third and fourth signals in quadrature with one another and having the frequency of a second periodic signal or phenomenon (the fourth one bearing the same phase relation to the third as the second does to the first), means for generating first, second, third and fourth product signals respectively representing the products of the first and the third, the first and the fourth, the second and the third, and the second and the fourth signals, means for generating a sum signal representing the sum of the first and fourth product signals and a difference signal representing the difference of the second and third product signals, means for differentiating the sum and difference signals with respect to time to produce differentiated sum and difference signals, means for generating fifth and sixth product signals representing respectively the product of the differentiated sum signal with the difference signal and the product of the differentiated difference signal with the sum signal, and means for generating an output signal representing the sum of the fifth and the sixth product signals.

The various means for generating the product signals are preferably substantially identical, each comprising a multiplying circuit having two inputs for the application of the two signals of which the product is required and an output at which, in operation, the product signal generated appears. The multiplying circuits may be modulator, in particular so-called "chopper," circuits which can be designed to generate a signal representing the product of two input signals by "chopping" (that is to say switching on and off) one signal under the control of the other or a substantially square wave signal derived from the other.

The present invention is further concerned with control systems for maintaining a first periodic signal or other phenomenon at substantially the same frequency as a second one. Such a system may be required for example for maintaining the rotary speed of two gas turbine engines substantially equal. According to a feature of the present invention, therefore, a control system comprises means for applying the first and second periodic signals, or first and second periodic signals having frequencies equal to those of the first and second periodic phenomena respectively, to signal generating apparatus according to the present invention, means for controlling the frequency of the first periodic signal or phenomenon in accordance with the magnitude and sense of an applied signal and means for applying the output of the signal generating apparatus to the frequency controlling means in such a sense as to cause it to adjust the frequency of the first periodic signal or phenomenon in the sense required to reduce the output of the signal generating apparatus towards zero, i.e. to control the frequency of the first periodic signal or phenomenon in such a manner as to make it substantially equal to that of the second.

Figure 2:
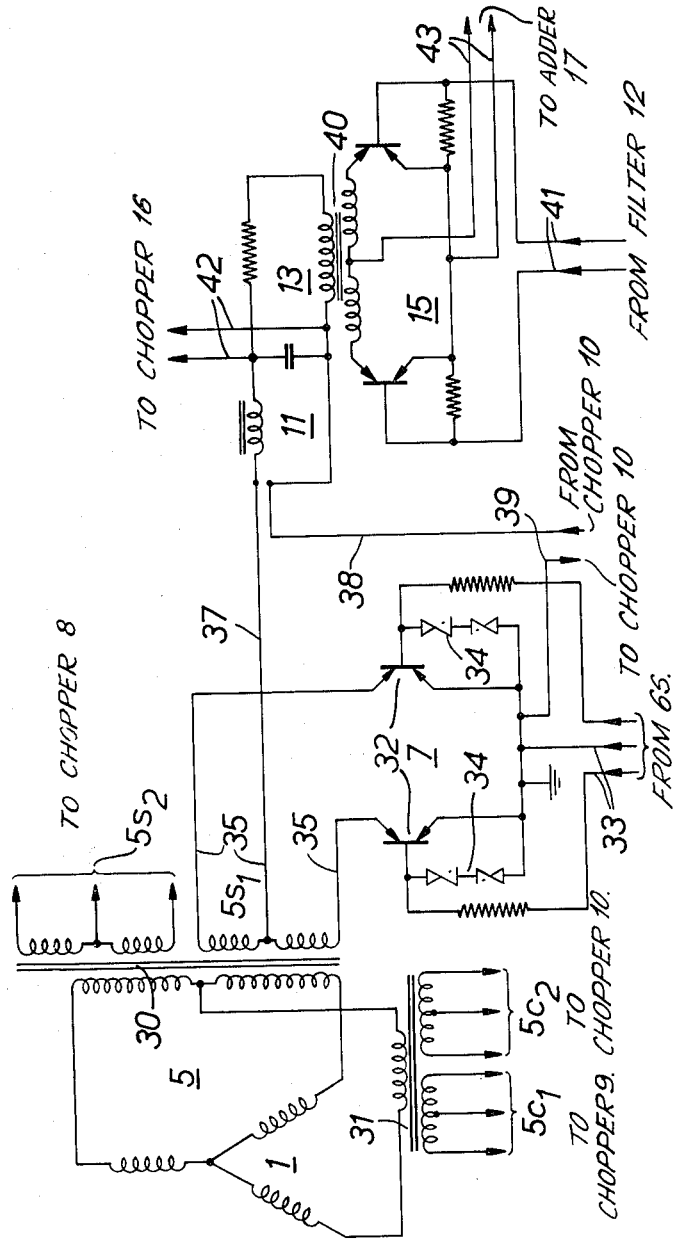

An example of a control system according to the feature of the present invention, incorporating an example of a signal generating apparatus in accordance with the present invention, will now be described with reference to the accompanying drawings in which:

FIGURE 1 shows a block diagram of the system, and
FIGURE 2 shows detailed circuit diagrams of various of the blocks included in FIGURE 1.

The system to be described is one in which the frequency of rotation of one gas turbine engine for example an aircraft's gas turbine engine is to be maintained substantially equal to the frequency of rotation of a second one. Such a system may be required for example in mutli-engined aircraft to prevent any passenger discomfort which may arise due to the generation of beat frequencies if the rotary speeds of the engines are not substantially equal.

FIGURE 1 shows a block diagram of the system as applied to two engines, the rotational speed of one being controlled by adjustment of its fuel supply, to maintain it substantially equal to the rotational speed of the other. It will be appreciated that further engines may be controlled by a similar system likewise to maintain their rotational speeds equal to that of the said other engine which thus becomes in effect a master engine. Turning now to FIGURE 1, tachometer generators 1 and 2 are driven respectively by shafts 3 and 4 coupled to engine No. 1 and engine No. 2, so as to generate in known manner three phase electrical signals representing the speeds of rotation of those engines. These signals are applied to converter networks 5 and 6 which each generate at separate outputs single phase signals respectively in phase and in quadrature with the rotation of the shaft 3 and 4. Assuming for the moment that engine No. 1 is rotating with an angular velocity $\omega + \Delta\omega$ radians per second and that engine No. 2 is rotating at a speed $\omega$ radians per second, the signals appearing at the outputs 5s and 5c of the network 5 may be taken respectively as being voltages given by $A_0 \sin(\omega+\Delta\omega)t$ and $A_0 \cos(\omega+\Delta\omega)t$. Similarly the signals appearing at the outputs 6s and 6c of the network 6 may be taken as being the voltages given by $A_0 \sin \omega t$ and $A_0 \cos \omega t$ respectively. It is assumed throughout this description that the duplicated elements are substantially identical so that the amplitudes of the outputs produced by them are the same. In the case of the tachometer generators 1 and 2, this means that they produce voltages of the same amplitude. Again, as indicated above, the voltages produced at the outputs of networks 5 and 6 are of equal amplitude $A_0$. The voltages $A_0 \sin(\omega+\Delta\omega)t$, $A_0 \cos(\omega+\Delta\omega)t$, $A_0 \sin \omega t$ and $A_0 \cos \omega t$ correspond respectively to the first second, third and fourth signals referred to in the general statements in the introduction to this specification.

The system further includes four identical modulator or chopper circuits 7–10, each arranged to produce an output voltage representing the product of two voltages applied to its inputs. The inputs of the chopper circuit 7 are connected to outputs 5s and 6s of networks 5 and 6. Similarly, the inputs of chopper circuit 8 are coupled to the outputs 5s and 6c, of chopper circuit 9 to outputs 5c and 6s and of chopper circuit 10 to the outputs 5c and 6c. The output voltages produced by the chopper circuits 7–10 may, therefore, be represented respectively by the expressions $A_1 \sin(\omega+\Delta\omega)t \sin \omega t$, $A_1 \sin(\omega+\Delta\omega)t \cos \omega t$, $A_1 \cos(\omega+\Delta\omega)t \sin \omega t$, and $A_1 \cos(\omega+\Delta\omega)t \cos \omega t$, these corresponding to the first, second, third and fourth product signals referred to above.

The product signals produced by chopper circuits 7 and 10 are added by suitably interconnecting their outputs, the sum signal produced which may be represented by the expression $A_2 \cos \Delta\omega t$ being applied to the input of a filter 11. Similarly, the product signals produced by the chopper circuits 8 and 9 are subtracted by suitably interconnecting their outputs to produce a difference voltage represented by the expression $A_2 \sin \Delta\omega t$ which is applied to the input of a filter 12, identical with the filter 11. The output from the filter 11 is applied to the input of a differentiating circuit 13 and one input of a chopper circuit 16, whilst the output of the filter 12 to the input of a differentiating circuit 14 and one input of a chopper circuit 15. The differentiating circuits 13 and 14 are identical as are the chopper circuits 15 and 16. The outputs of differentiating circuits 13 and 14 are applied to the second inputs of the chopper circuits 15 and 16 respectively. The signals produced by the differentiating circuits 13 and 14 may be respectively represented by the expressions $-A_3\Delta\omega \sin \Delta\omega t$ and $A_3\Delta\omega \cos \Delta\omega t$. The chopper circuits 15 and 16 respectively act to produce fifth and sixth product signals which are each the product of one of the differentiated signals with the output of the other of the filters 11 and 12, that is with a signal which may be represented by $A_4 \sin \Delta\omega t$ or $A_4 \cos \Delta\omega t$, as the case may be. The outputs of the chopper circuits 15 and 16 may, therefore, be represented by the expressions $A_5\Delta\omega \sin^2 \Delta\omega t$ and $A_5\Delta\omega \cos^2 \Delta\omega t$. These product signals are applied to an adding circuit 17 to produce an output signal equal to $A_6\Delta\omega$. It will be appreciated that the sense of this signal will depend on the sense of the difference of the rotational speeds of engines Nos. 1 and 2. For example, depending on the manner of arrangement of the signal senses this output signal may be positive if engine No. 1 is faster than engine No. 2 and negative if it is slower or vice versa. The magnitude of the signal is directly proportional to the difference in speed of rotation of the two engines.

The output of the adding circuit 17 is applied to the input of a servo control system 18, a servo motor 19 of which drives a shaft 20 which is coupled to the throttle actuating mechanism of engine No. 1. The system is designed to operate with modulated A.C. signals and, therefore, includes a modulator 21 which, besides being connected to a carrier voltage source 22 is connected in series with the output of the adding circuit 17 the input of a servo amplifier 23 and a feed back output from the amplifier 23. The output from the amplifier 23 is connected across the control phase winding of the motor 19, the reference phase winding of which is connected to the voltage source 22. The sense of the connection of the shaft 20 to the throttle control of engine No. 1 is determined so that the system operates to reduce the speed of that engine when $\Delta\omega$ is positive, i.e. when engine No. 1 is running faster than engine No. 2. Similarly if engine No. 1 is running more slowly than engine No. 2 and $\Delta\omega$ is negative, shaft 20 will operate to increase the speed of engine No. 1.

Elements 1–17 of FIGURE 1 constitute an example of electric signal generating apparatus according to the present invention which, together with servo system 18 and the fuel control actuated by the shaft 20, constitutes an example of a control system according to the invention.

FIGURE 2 of the accompanying drawings shows a more detailed circuit diagram of blocks 1, 5, 7, 11, 13 and 15 in FIGURE 1. The tacho generator 1 has a conventional three phase output winding which is coupled to a conventional Scott connected network 5 having a first transformer 30 with a centre tapped primary winding and a second transformer 31. In known manner the voltages appearing across the secondary windings of the transformers 30 and 31 are in quadrature with another and assuming the shaft 3 (FIGURE 1) has an angular velocity $(\omega+\Delta\omega)$ these voltages may be represented as $A_0 \sin (\omega+\Delta\omega)t$ and $A \cos (\omega+\Delta\omega)t$ respectively. Each of the transformers 30 and 31 has two identical centre tapped secondary windings. The output connections to the secondary windings of transformer 30 form first and second output terminals $5s1$ and $5s2$ of network 5 (in FIGURE 1 these are shown for convenience as a single pair of terminals $5s$ having two sets of connections connected to it in parallel), whilst the connections to the secondary windings of transformer 31 similarly constitute two sets of output terminals $5c1$ and $5c2$. As shown in FIGURE 2, the terminals $5c1$ are connected to the chopper circuit 7, whilst terminals $5s2$, $5c1$ and $5c2$ are connected to chopper circuits 8, 9 and 10 respectively which, being identical with chopper circuit 7 apart from their external connections, are not shown in FIGURE 2.

Chopper circuit 7 includes two symmetrical transistors 32 and has a second set of input connections 33 which are connected to the output terminals $6s1$ of network 6 which is identical with network 5 but is not shown in FIGURE 2. The sinusoidal voltage appearing across the connections 33 is subjected to limiting by Zener diode circuits 34 and is applied across the bases of the transistors 32. The connections 35 from the terminals $5s1$ are connected to one pair of emitter/collector electrodes of the transistors 32, the other pair of which are connected to earth. In known manner, the signal $A_0 \sin (\omega+\Delta\omega)t$, appearing across the terminals $5s1$ is chopped by the signal $A_0 \sin \omega t$ applied across the connections 33 from terminals $6s1$, the output signal appearing across connection 37 and earth being a signal representing the product $A_1 \sin (\omega+\Delta\omega)t \sin \omega t$.

Reference to FIGURE 1 will show that the output from chopper circuit 7 is interconnected with that from chopper circuit 10 and the input of a filter 11. The filter 11 is shown in FIGURE 2 as a simple low pass filter, the input to it is connected to the connections 37 from chopper circuit 7 and a similar connection 38 from chopper circuit 10. A connection 39 links the earth lines of chopper circuits 7 and 10. The output of the filter 11 is connected to the differentiating circuit 13, the output of which is a transformer 40 the secondary winding of which is connected to one input of chopper circuit 15 which is generally similar to chopper circuit 7 and will not be described here in any detail. The other input to chopper circuit 15 comes from the output of filter 12 by means of connections 41, whilst a second pair of connections 42 from the output of filter circuit 11 are connected to chopper circuit 16 which is identical with chopper circuit 15 and is not shown in FIGURE 2. The input signal to chopper circuit 15 applied to it from transformer 40 is the signal $A_3\Delta\omega \sin \Delta\omega t$ whilst that applied to it over the input connections 41 is the signal $A_4 \sin \Delta\omega t$, the output across connections 43 being the product signal $A_5\Delta\omega \sin^2 \Delta\omega t$. This product signal is applied to one input of the adder circuit 17.

The circuits of the adder circuit 17 and the servo system 18 are largely conventional and will not be described here in detail. The adder circuit 17 may for example include a pair of transductors connected in push/pull, the modulator 21 may be of any convenient kind, for example a simple symmetrical transistor modulator circuit as described in British patent specification No. 912,-163 published December 5, 1962 in the name of S. Smith & Sons (England) Ltd., and the amplifier 23 may be a two stage push/pull transformer-coupled transistor amplifier. The feed back voltage may be derived from a transformer connection across the output from the second stage of the amplifier.

It will be appreciated that it may in some cases be desirable to modify the control so that the movement of the output shaft 20 is not directly proportional to the magnitude of the error voltage $\Delta\omega$ which is applied to the servo system 18, the characteristics of the system being determined accordingly. Whilst particular circuits have been described, with reference to FIGURE 2, other equivalent circuits may be employed in their place.

What I claim is:

1. Electric signal generating apparatus comprising means for generating first and second signals in quadrature with one another and having the frequency of a first periodic signal or phenomenon, means for generating third and fourth signals in quadature with one another and having the frequency of a second periodic signal or phenomenon (the fourth one bearing the same phase relation to the third as the second does to the first), means for generating first, second, third and fourth product signals respectively representing the products of the first and the third, the first and the fourth, the second and the third, and the second and the fourth signals, means for generating a sum signal representing the sum of the first and fourth product signals and a difference signal representing the difference of the second and third product signals, means for differentiating the sum and difference signals with respect to time to produce differentiated sum and difference signals, means for generating fifth and sixth product signals representing respectively the product of the differentiated sum signal with the difference signal and the product of the differentiated difference signal with the sum signal, and means for generating an output signal representing the sum of the fifth and the sixth product signals.

2. Apparatus in accordance with claim 1, wherein the means for generating the product signals are substantially identical with each other, each comprising a multiplying circuit having two inputs to which the signals whose product is required are respectively applied and an output at which in operation the product signal appears.

3. Apparatus in accordance with claim 2 in which the multiplying circuits are modulator circuits in which one of said signals is switched on and off under the control of the other.

4. Apparatus as claimed in claim 3 wherein the modulator circuits each comprise symmetrical transistors, one signal being applied to the emitter electrodes of said transistors and the other signal being applied to their base electrodes.

5. A control system for maintaining a first periodic signal at substantially the same frequency as a second periodic signal comprising means for applying the said signals to signal generating apparatus as claimed in claim 1, means for controlling the frequency of the first periodic signal in accordance with the magnitude and sense of an applied signal and means for applying the output of the signal generating apparatus to the frequency controlling means in such a manner as to cause it to adjust the frequency of the first periodic signal in the sense to reduce the output of the signal generating apparatus towards zero and thereby to control the frequency of the first periodic signal in such a manner as to make this frequency substantially equal to the frequency of the second periodic signal.

6. An engine control system for maintaining the rotational speeds of two engines substantially equal comprising means for generating first and second signals in phase quadrature with one another and having a frequency in accordance with the rotational speed of one of said two engines, means for generating third and fourth signals in phase quadrature with one another and having a frequency in accordance with the rotational speed of the other of said two engines, means for generating first, second, third and fourth product signals respectively representing the products of the first and the third, the first and the fourth, the second and the third, and the second and the fourth signals, means for generating a sum signal representing the sum of the first and fourth product signals and a difference signal representing the difference of the second and third product signals, means for differentiating the sum and difference signals with respect to time to produce differentiated sum and difference signals, means for generating fifth and sixth product signals representing respectively the product of the differentiated sum signal with the difference signal and the product of the differentiated difference signal with the sum signal, means for generating a control signal representing the sum of the fifth and the sixth product signals, and servo means responsive to said control signal for controlling the rotational speed of one of the two engines in a sense to reduce said sum of the fifth and sixth product signals to zero.

References Cited by the Examiner
UNITED STATES PATENTS

| | | | |
|---|---|---|---|
| 2,894,187 | 7/1959 | Chapman | 317—6 X |
| 2,910,638 | 11/1959 | Linn | 318—329 X |
| 2,933,682 | 4/1960 | Clark | 328—133 X |
| 3,001,115 | 9/1961 | Gendreu et al | 318—137 |
| 3,152,297 | 11/1964 | Peaslee | 321—69 X |
| 3,176,233 | 3/1965 | Adams et al. | 328—92 |
| 3,193,769 | 7/1965 | Graham et al. | 328—133 |

NEIL C. READ, *Primary Examiner.*

SAMUEL BERNSTEIN, *Examiner.*

D. YUSKO, *Assistant Examiner.*